United States Patent Office.

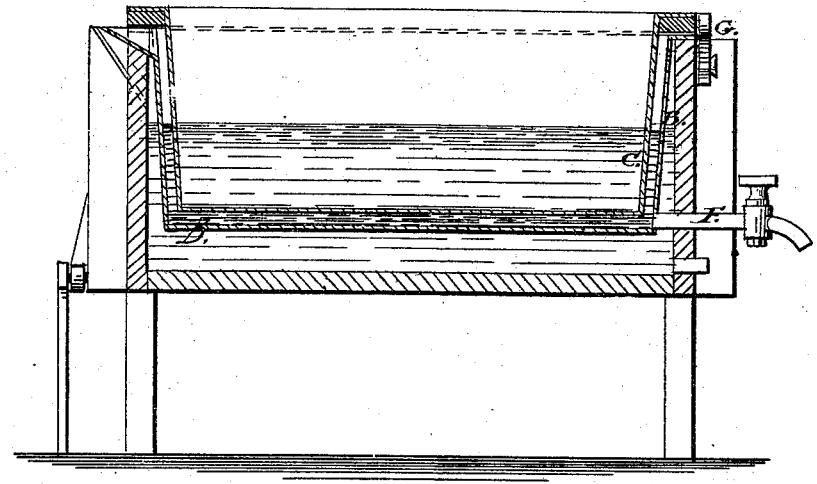
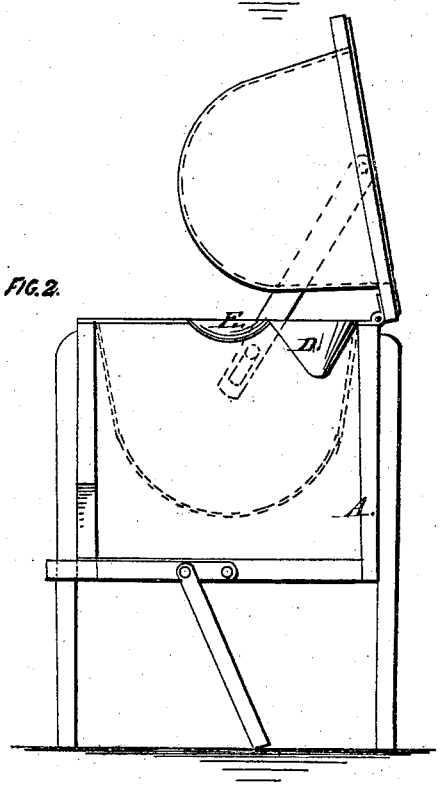

RUFUS D. GARDNER, OF WATERTOWN, NEW YORK.

Letters Patent No. 91,928, dated June 29, 1869.

IMPROVEMENT IN MILK-COOLERS.

The Schedule referred to in these Letters Patent and making part of the same.

*To all whom it may concern:*

Be it known that I, RUFUS D. GARDNER, of Watertown, in the county of Jefferson, and State of New York, have invented a new and useful Improvement in Milk-Coolers; and I do hereby declare that the following is a full, clear, and exact description thereof, which will enable others skilled in the art to make and use the same, reference being had to the accompanying drawings, forming part of this specification.

This invention relates to improvements in apparatus for cooling milk; and

It consists in hinging together the two pans between which the milk is cooled, and providing the inner pan with a pivoted bar or arm, whereby said pan is adapted to be swung up and supported in a raised position, for the purpose of presenting its bottom to be cleaned, and to afford ready access to the interior of the outer pan; also, in the arrangement of spouts, by which the milk is poured between the pans, and the water or cooling-liquid around the outer pan.

Figure 1 represents a longitudinal sectional elevation, and

Figure 2, an end elevation of my improved apparatus.

Similar letters of reference indicate corresponding parts.

A represents a vat, of wood or other substance, preferably supported on legs.

B represents a sheet-metal vat, arranged within the vat A, so as to form a space between the surfaces of the two, and in the said vat B another one, C, is similarly arranged, and hinged to the upper edge of the first.

Funnels D and E are provided to communicate respectively with the spaces on each side of the vat B, and a faucet, F, leading from within the vat B, is provided.

The vats A and C are filled with water or other cooling-medium, and the milk to be cooled poured into the vat B, and allowed to flow through the same in contact with the shells of the vats B and C, which, being cooled by the water or other cooling-medium on their opposite sides, rapidly extract the heat from the milk.

The vat C is hinged to the vat A, and the bar G is pivoted to it, and arranged to hold it in a raised position, as shown in fig. 2, whereby ready access is permitted to the interior of the pan B for cleaning, and to the bottom of the pan C, for a like purpose.

Having thus described my invention,

I claim as new, and desire to secure by Letters Patent—

1. The combination of the pans B and C, when the latter is hinged to the edge of the former, and adapted to swing up and be supported in a raised position by the pivoted bar G, as herein described, for the purpose specified.

2. In combination with the above, the funnels D E, when arranged with relation to the pans B C and vat A, as described, for the purpose of directing the milk between the pans and the cooling-liquid around the outer pan, as herein set forth and shown.

RUFUS D. GARDNER.

Witnesses:
CHANDLER C. CHASE,
SCHUYLER S. GARDNER.